United States Patent
Ashley et al.

(10) Patent No.: US 9,374,689 B1
(45) Date of Patent: Jun. 21, 2016

(54) APPARATUS AND METHOD FOR SUPPORTING TELEPHONIC SYNTHETIC IDENTITIES

(71) Applicant: Anonyome Labs, Inc., Draper, UT (US)

(72) Inventors: Paul Ashley, Queensland (AU); Steve Shillingford, Draper, UT (US); Greg Clark, San Francisco, CA (US); Simon Canning, Queensland (AU); Tim Bartley, Queensland (AU); Neil Readshaw, Queensland (AU)

(73) Assignee: Anonyome Labs, Inc., Draper, UT (US)

( * ) Notice: Subject to any disclaimer, the term of this patent is extended or adjusted under 35 U.S.C. 154(b) by 0 days.

(21) Appl. No.: 14/578,296

(22) Filed: Dec. 19, 2014

Related U.S. Application Data

(60) Provisional application No. 62/012,244, filed on Jun. 13, 2014.

(51) Int. Cl.
| | |
|---|---|
| *H04W 12/00* | (2009.01) |
| *H04W 4/12* | (2009.01) |
| *H04M 3/42* | (2006.01) |
| *H04W 4/16* | (2009.01) |

(52) U.S. Cl.
CPC ............ *H04W 4/12* (2013.01); *H04M 3/42059* (2013.01); *H04W 4/16* (2013.01)

(58) Field of Classification Search
CPC .............................. H04W 12/08; G06F 21/35
USPC ............ 455/410, 411, 452.1, 452.2, 509, 515
See application file for complete search history.

(56) References Cited

U.S. PATENT DOCUMENTS

| | | | | |
|---|---|---|---|---|
| 2002/0116608 | A1* | 8/2002 | Wheeler ................ | G06Q 20/00 713/155 |
| 2009/0284347 | A1* | 11/2009 | Zimmerman ........... | G06F 21/35 340/5.81 |
| 2015/0304300 | A1* | 10/2015 | Bender ............... | H04L 63/0421 726/4 |

* cited by examiner

*Primary Examiner* — John J Lee
(74) *Attorney, Agent, or Firm* — Cooley LLP

(57) ABSTRACT

A machine has a processor and a memory connected to the processor. The memory stores instructions executed by the processor to match a communication sender number or a communication receiver number associated with a communication to a synthetic identity. A parameter associated with the synthetic identity is selected. Delivery of the communication is coordinated such that the recipient of the communication views the parameter upon receipt of the communication.

8 Claims, 10 Drawing Sheets

APPARATUS AND METHOD FOR SUPPORTING TELEPHONIC SYNTHETIC IDENTITIES

CROSS-REFERENCE TO RELATED APPLICATION

This application claims priority to U.S. Provisional Patent Application Ser. No. 62/012,244, filed Jun. 13, 2014, the contents of which are incorporated herein by reference.

FIELD OF THE INVENTION

This invention relates generally to telephonic communications. More particularly, this invention relates to techniques for supporting telephonic synthetic identities.

BACKGROUND OF THE INVENTION

The use of multiple synthetic identities enables a user to both protect their real identity as well as compartmentalize their online and offline activities. A user may have multiple synthetic identities, each with different identity attributes (e.g., different name, date of birth, telephone, email, delivery address, and so on). The user will select which identity is appropriate in a given situation and which identity attributes are required for that identity. For example, a user may browse the web with a real user identity, limiting browsing to news sites. The user may then decide to swap to a different identity (i.e., browse with a synthetic identity). The user may want to do this because he or she does not want social media interaction, which may be political in nature, to be linked to a real identity. Later the user might swap to another synthetic identity, so that the user can purchase goods on e-commerce sites without those purchases being linked to any other identity.

One of the complexities of using multiple synthetic identities is managing telephony communication with these identities. Over the course of any week a user may act using a real identity and different synthetic identities. The user will need a different phone number for each identity supporting incoming and outgoing messages and voice calls. The difficulty for the user is how to manage the communication interaction of multiple identities when a user typically has one mobile phone number. It can quickly become very confusing for the user, and error prone, such that the user may inadvertently disclose a real identity.

One relatively straightforward approach is for the user to purchase multiple phone numbers, one for their real identity and one for each synthetic identity, and swap from one to another. For example, the user could purchase a separate mobile phone for each identity. The user gives out the phone number based on the interaction context. Unfortunately this scenario is not practical as users do not want to carry multiple mobile phones, and normal mobile phone contracts don't allow dynamic adding and deleting of phone services.

Accordingly, there is a need for a better system for managing telephonic communication for multiple synthetic identities. In particular, a user should be able to receive and initiate both messages and voice calls from any real or synthetic identity, and be clear at any time which identity is in context.

SUMMARY OF THE INVENTION

A machine has a processor and a memory connected to the processor. The memory stores instructions executed by the processor to match a communication sender number or a communication receiver number associated with a communication to a synthetic identity. A parameter associated with the synthetic identity is selected. Delivery of the communication is coordinated such that the recipient of the communication views the parameter upon receipt of the communication.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The telephony based techniques disclosed herein contemplate telephone applications in the form of telephone calls and text messages. Consider a situation where a user wants to send or receive text messages (e.g., via Short Message Service (SMS) or Multimedia Message Service (MMS)). The user also wants to call or receive calls. This leads to a number of requirements that are satisfied by this invention. In particular, the invention facilitates a user communicating at any time using a real identity or a variety of synthetic identities. Each synthetic identity has its own phone number. The invention makes it clear to the user which identity is in context for all communications; this reduces the chance that the user will become confused and inadvertently disclose an identity. A user may easily discard the synthetic identity and associated phone number. Such an action does not impact the communications of any other identity.

Figure 1:
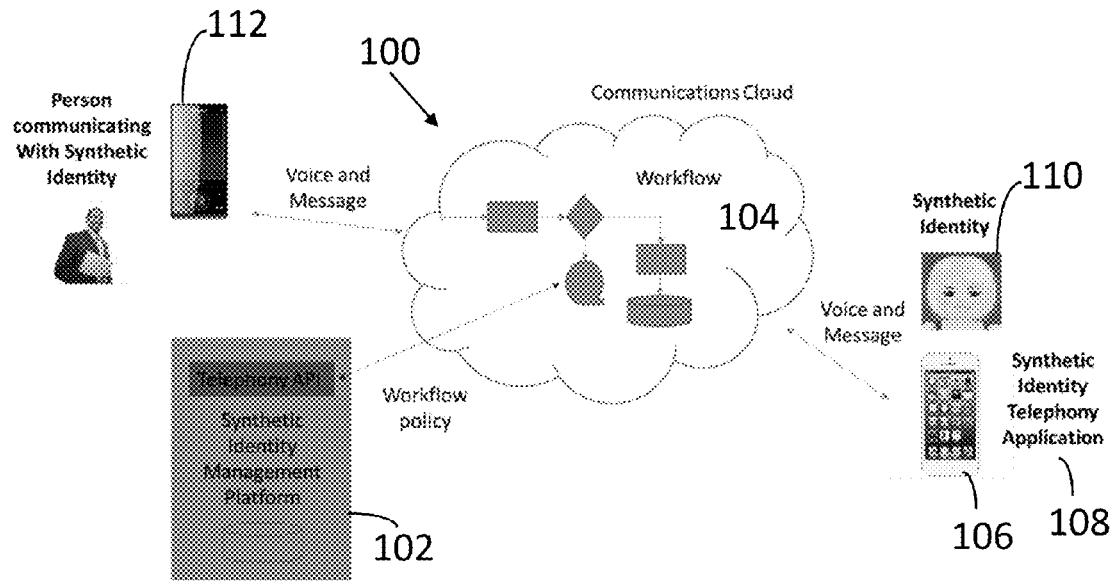
FIG. 1 illustrates a system configured in accordance with an embodiment of the invention.

FIG. 1 illustrates a system 100 configured in accordance with an embodiment of the invention. A synthetic identity management platform 102 is operative with a communication cloud 104. The synthetic identity management platform 102 includes one or more processors to execute instructions stored in an associated memory. The instructions executed by the processor implement the operations described herein. The Synthetic Identity Management Platform 102 (platform) enables the creation, management and deletion of the synthetic identities for the user. This includes creation of identity attributes such as name, date of birth, credit, shipping address and phone numbers to be used for messages and voice communication. It also provides some coordination of messages and voice communication.

The Communications Cloud 104 is a computing resource available over an open network to facilitate communication applications, such as messaging and telephony applications. A communication cloud resource vendor provides configurable workflows for controlling communication applications through vendor supplied Application Program Interfaces (APIs). The communication applications support communications between two or more parties, where each party may be using a real or a synthetic identity. Communication cloud resources are used by communication application developers to hide the complexity of telecommunication carrier interactions.

A client device 106 runs a synthetic identity telephony application 108. The client device 106 is a mobile device with a processor and associated memory to store instructions executed by the processor to implement operations of the invention. In this example, the client device 106 is currently communicating as the synthetic identity called "Shopping Sally" 110. The avatar and name reminds the user of the purpose of this synthetic identity. Another client device 112 communicates with client device 106 associated with synthetic identity 110.

Figure 2:
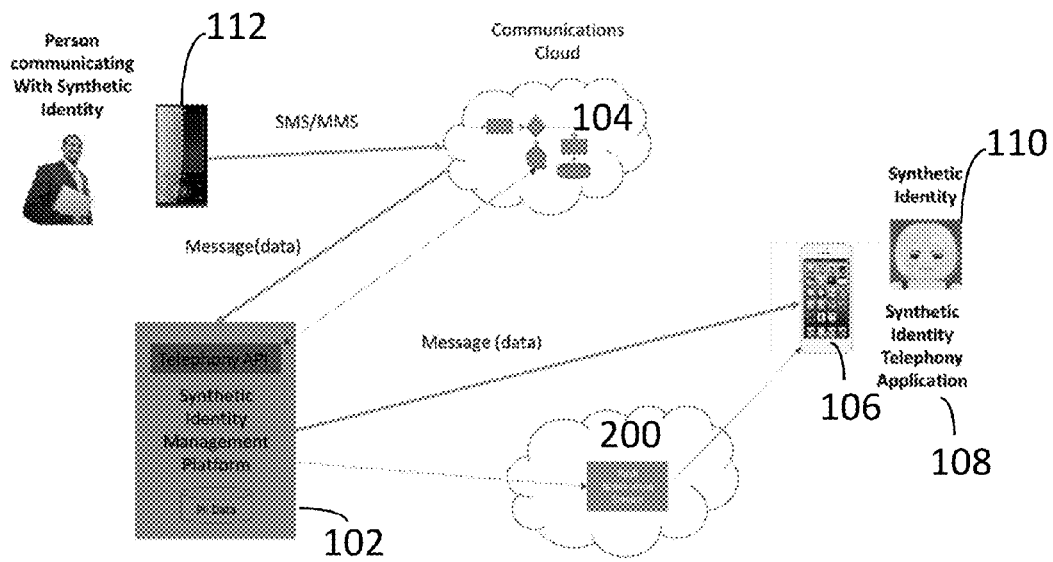
FIG. 2 illustrates a system configured in accordance with another embodiment of the invention.

Consider the scenario of FIG. 2 where client device 112 sends a message (SMS/MMS) to the synthetic identity's phone number. This phone number is a specific number that the Communication Cloud 104 has provisioned for the Shopping Sally identity 110. Upon receiving the message, the Communication Cloud 104 communicates with the Synthetic Identity Management Platform 102. It sends the message to the Synthetic Identity Management Platform 102 and asks for further instructions. The platform 102 receives the message and notifies the communication cloud 104 that there is no further action required from the Communication Cloud 104. The Synthetic Identity Management Platform 102 then uses the mobile's Push Notification Service 200 to notify the Synthetic Identity Telephony Application 108 that a message is available. The Push Notification Service 200 is a standard service for mobile platforms, which allows a service to communicate notifications with an application on the user's mobile device. After receiving notification from the Push Notification Service 200, the Synthetic Identity Telephony Application 108 calls into the Synthetic Identity Management Platform 102 to retrieve the message.

Figure 3:
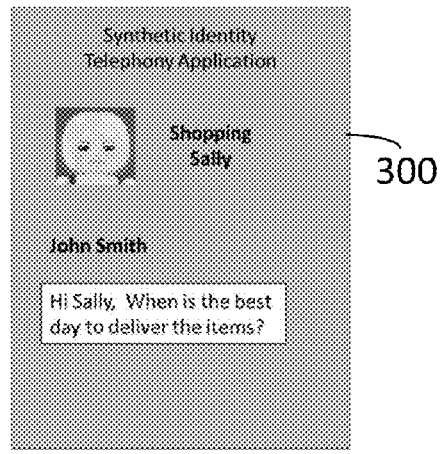
FIG. 3 illustrates an interface utilized in accordance with an embodiment of the invention.

FIG. 3 shows a user interface 300 for the Synthetic Identity Telephony Application. The user interface 300 illustrates a received message. The user interface 300 provides context of the message (i.e., it specifies which Synthetic Identity has received the message). In this case the avatar of Shopping Sally is shown. Additionally, the application shows the sender of the message (caller ID), which is John Smith. The two pieces of information are vital for the user to be sure of the context and to know how to respond. Note that a standard telephony application on a mobile device is not able to display the two pieces of context information and hence cannot support multiple synthetic identities in a practical way.

Figure 4:
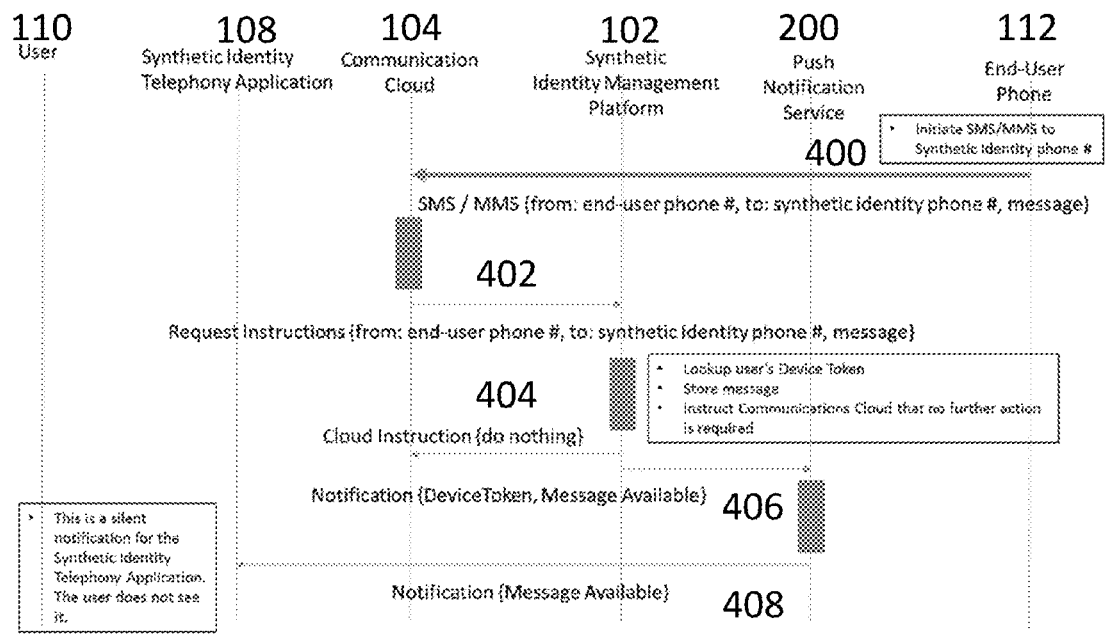
FIG. 4 illustrates incoming message signal processing in accordance with an embodiment of the invention.

FIG. 4 more particularly characterizes the operations discussed in connection with FIG. 2. End user device 112 initiates an SMS/MMS message 400 to the synthetic identity 110. The communication cloud 104 processes the message and requests 402 instructions from the synthetic identity management platform 102. In this case, the communication cloud 104 is advised that no further action 404 is required. The platform 102 provides a notification 406 to the push notification service 200. The push notification service 200 sends a notification message 408 to the synthetic identity telephone application 108.

Figure 5:
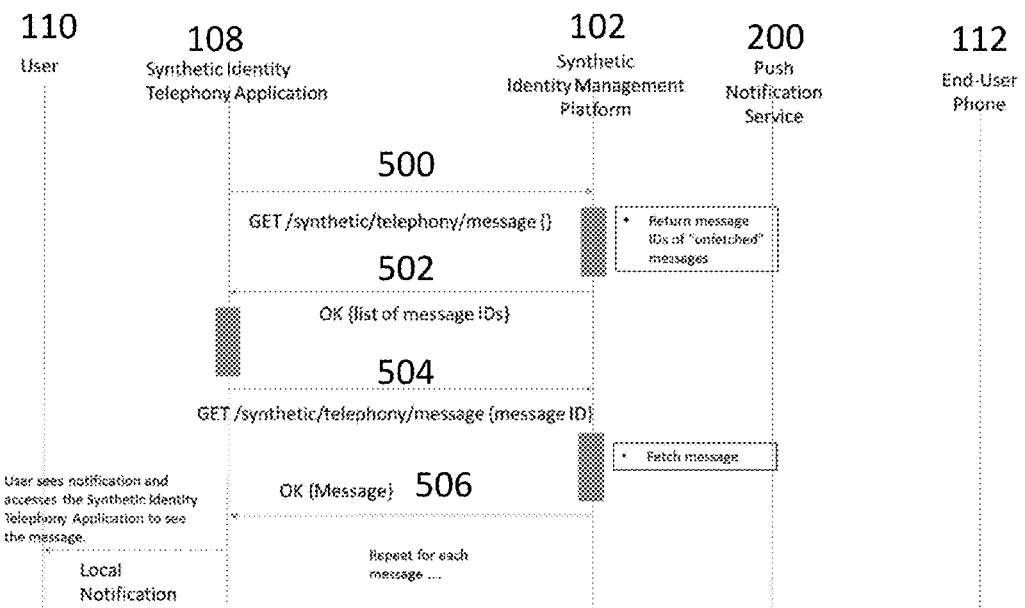
FIG. 5 illustrates additional incoming message signal processing in accordance with an embodiment of the invention.

Turning to FIG. 5, the synthetic identity telephone application 108 requests the message 500 from the synthetic identity management platform 102. The platform 102 then supplies a list 502 of messages. The application 108 then specifies a message 504 to fetch. The platform 102 then supplies the specified message 506 to the application 108, which allows the user 110 to view it, as shown in FIG. 3. Additional messages may be fetched in the same manner.

Figure 6:
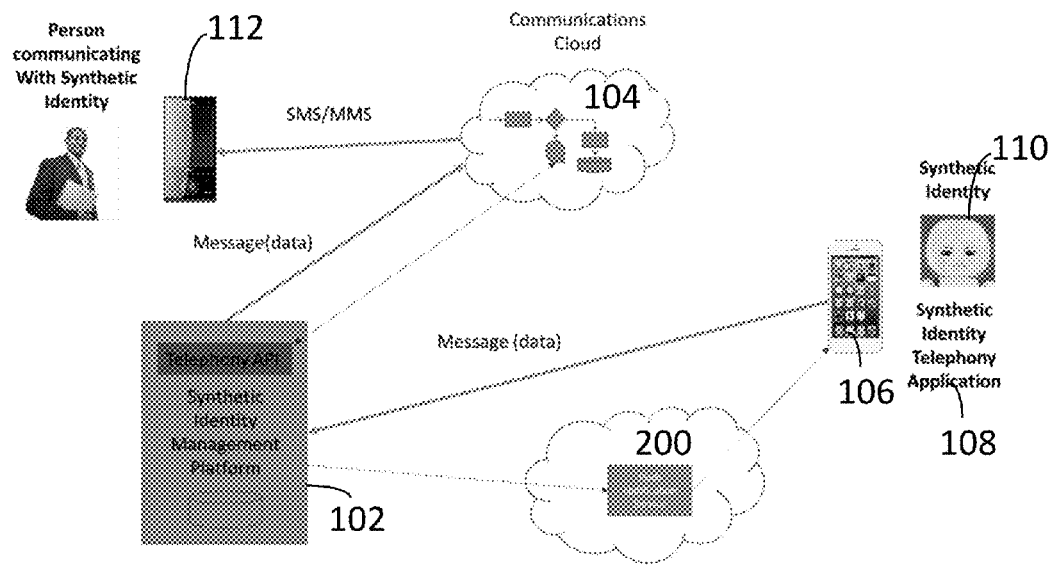
FIG. 6 illustrates outgoing message signal processing in accordance with an embodiment of the invention.

FIG. 6 illustrates a scenario in which the Synthetic Identity (Shopping Sally) 110 sends a message (SMS/MMS) to an end user device 112. The Synthetic Identity Telephony Application 108 sends a message to the Synthetic Identity Management Platform 102. The Synthetic Identity Management Platform 102 sends the message to the Communications Cloud 104. The Communication Cloud 104 sends the SMS/MMS to the end user's mobile device 112. This sequence is asynchronous; it requires an out of bound notification or regular polling to know when a particular step is completed. The implementation is different from a "synchronous" sequence where the component waits at each step for a completed response. In the sequence the Push Notification Service 200 is used to notify the Synthetic Identity Telephony Application 102 of the current status (e.g., message has been sent to the Communications Cloud 104, message has been successfully delivered to the end user 112).

Figure 7:
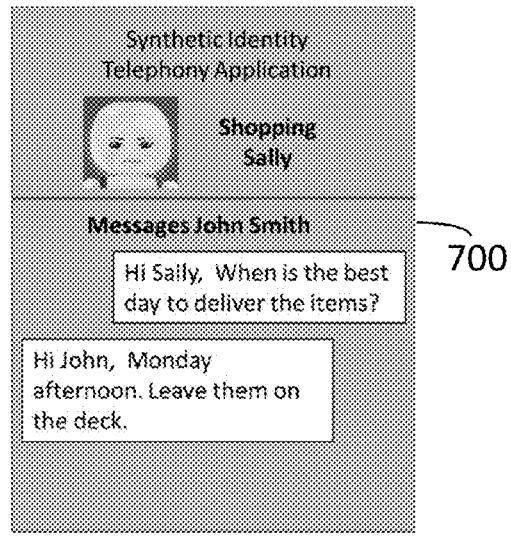
FIG. 7 illustrates a user interface utilized in accordance with an embodiment of the invention.

FIG. 7 shows an interface 700 for when a user is sending a message (or in the case shown replying to the original message). The application 108 groups messages by Synthetic Identity (Shopping Sally) and also by end user (John Smith). The user interface 700 enables the user to understand the context of the received message and helps the user to send the correct response. Note that the end user (John Smith) will see the message originating from the synthetic identity phone number (i.e., Shopping Sally's phone number). This keeps communication in the right context. The user interface 700 is designed to stop the user from becoming confused and to remain clear at all times about the identity context.

Figure 8:
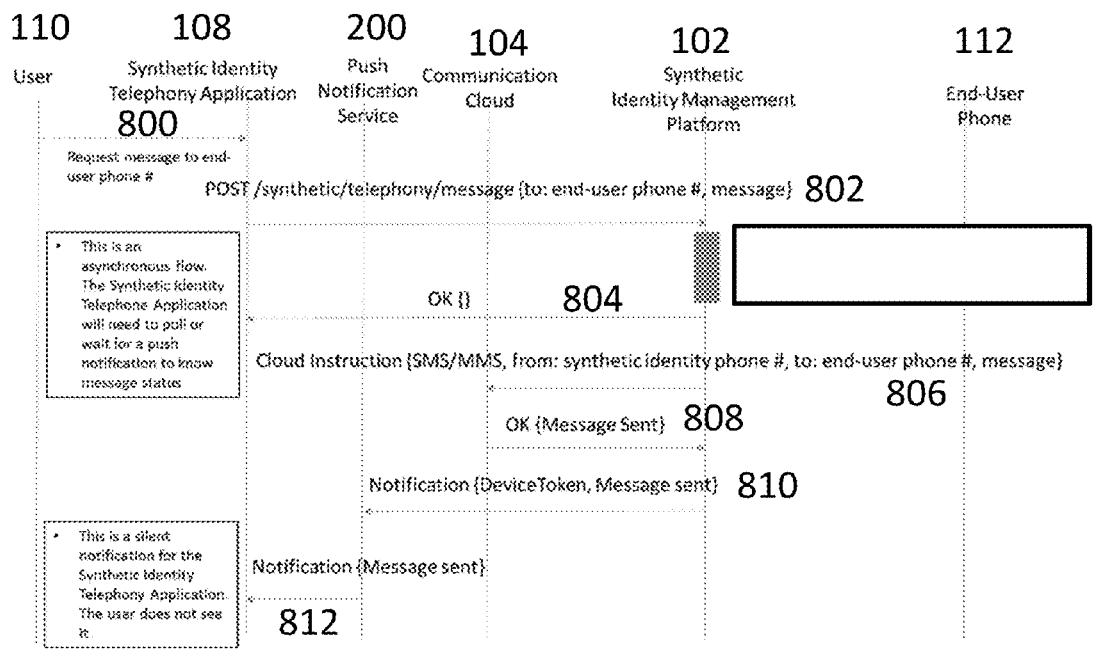
FIG. 8 illustrates outgoing message signal processing in accordance with an embodiment of the invention.

FIG. 8 provides a more detailed characterization of the processing of FIG. 6. User 110 inputs a message 800 destined for the end user phone 112 into the synthetic identity telephony application 108. The application 108 posts the message 802 to the synthetic identity management platform 102. The platform 102 looks up the synthetic identity telephone number and instructs the communication cloud 104 to initiate a text to end user phone from the synthetic identity telephone number.

Signal 804 between the platform 102 and the application 108 demonstrates the asynchronous processing associated with this embodiment of the invention. The application 108 needs to poll the platform 102 or wait for a push notification from the platform 102 to know the status of the message. The platform 102 then sends instructions 806 to the communication cloud 104. The instructions 806 may specify the synthetic identity phone number, the end-user phone number and the message. An acknowledgement 808 is sent from the communication cloud 104 to the platform 102. A notification 810 is then sent from the platform 102 to the push notification service 200. The push notification service 200 then sends the message 812 to the application 108. This message is a silent notification for the application; the user does not see it.

Figure 9:
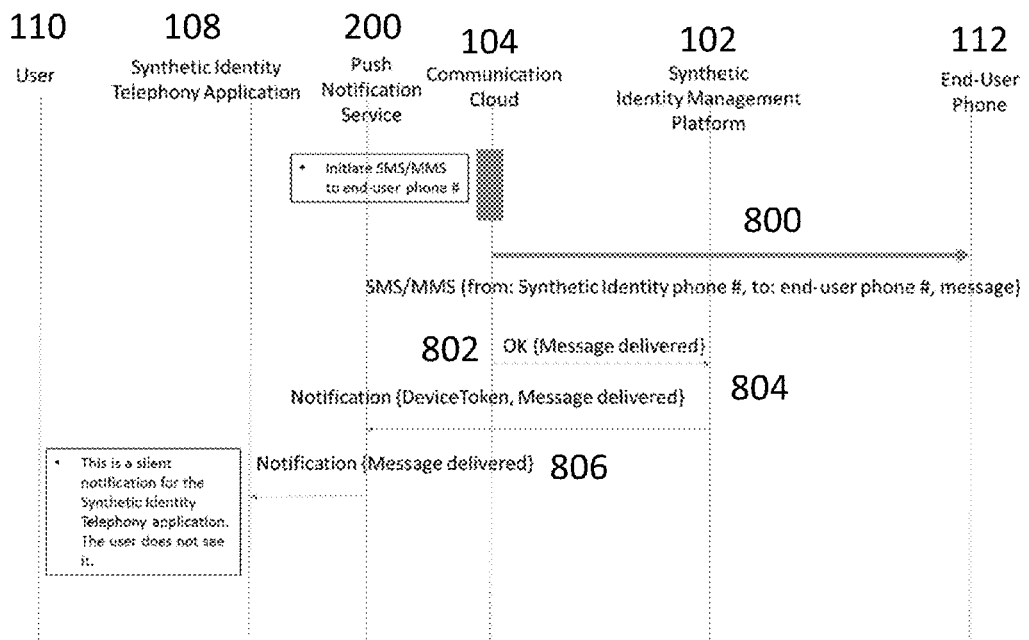
FIG. 9 illustrates additional outgoing message signal processing in accordance with an embodiment of the invention.

Turning to FIG. 9, the next operation is for the communication cloud 104 to deliver the message 800 to the end-user phone 112. The communication cloud 104 confirms 802 with the platform 102 that the message is delivered. The platform 102 sends a notification 804 to the push notification service 200, which sends a notification 806 to the application 108.

An improvement to this processing can be achieved when the receiver is also a synthetic identity with a Synthetic Identity Telephony Application. In this case the Communications Cloud 104 does not need to be used, and instead of an SMS/MMS, the receiving Synthetic Identity Telephony Application is notified of a message and retrieves it directly from the Synthetic Identity Management Platform 102. This is shown in FIG. 10.

Figure 10:
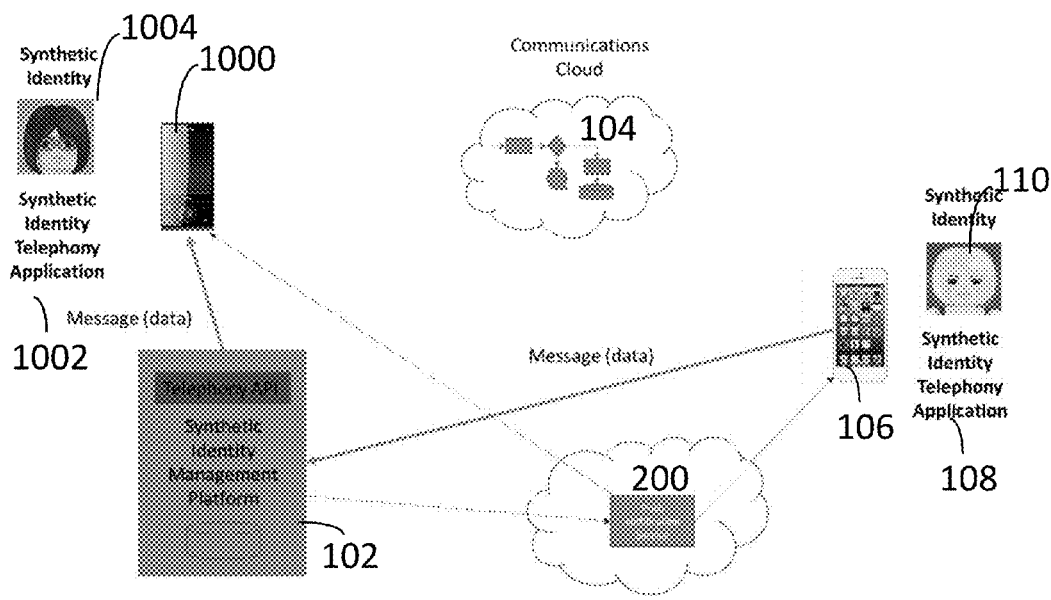
FIG. 10 illustrates outgoing message signal processing for a different synthetic identity.

FIG. 10 corresponds to FIG. 6, but includes a client device 1000 executing a synthetic identity telephone application 1002 to service synthetic identity 1004. In this case the Communication Cloud 104 can be bypassed altogether and the Synthetic Identity Management Platform 102 coordinates the delivery of the message. Note that the sender does not know that she is sending to another synthetic identity; it is up to the Synthetic Identity Management Platform 102 to determine this.

Figure 11:
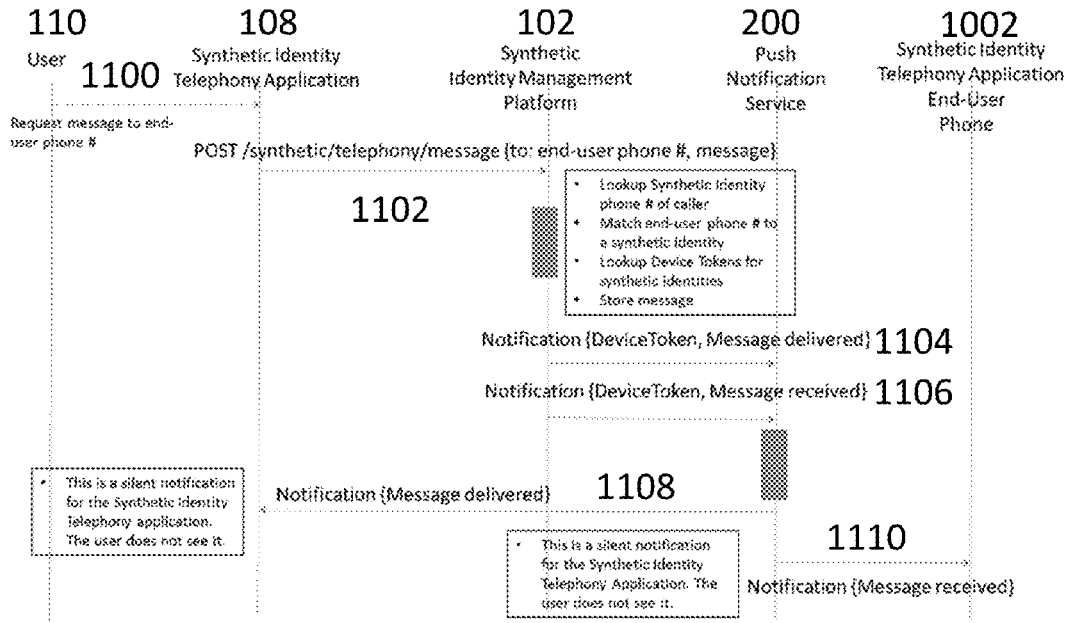
FIG. 11 illustrates outgoing message signal processing for a different synthetic identity.
Figure 12:
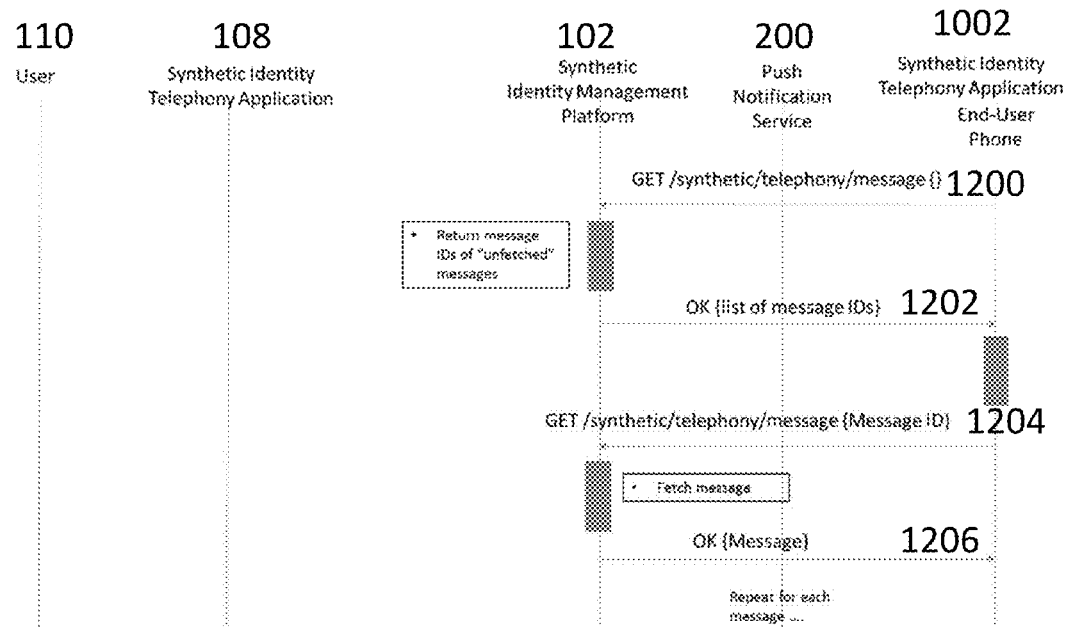
FIG. 12 illustrates additional outgoing message signal processing for a different synthetic identity.

The detailed underlying signal processing is shown in FIGS. 11 and 12. User 110 generates a message 1100 utilizing the synthetic identity telephone application 108. The application 108 posts the message 1102 to the synthetic identity management platform 102. The platform 102 looks up the synthetic identity phone number of the caller (i.e., synthetic identity 110 associated with application 108 and device 106). At the platform 102, the end user phone number is matched to a synthetic identity. Device tokens for both synthetic identities are looked up and the message is stored. A first notification 1104 is then sent to the push notification service 200. This push notification is to tell the sending synthetic identity telephony application that the message has been delivered. Another notification 1106 is sent to the push notification service 200. This push notification is to tell the receiving synthetic identity telephony application that message has been received. A message delivered notification 1108 is then sent to the sending application 108. A notification 1110 is then sent to the receiving application 1002.

Turning to FIG. 12, in response to the notification 1110, the receiving application 1002 requests 1200 the message from the platform 102. The platform 102 returns a list of messages 1202 that have not been fetched. The application 1002 sends a message identification 1204 for a message to be returned. The platform 102 then supplies the message 1206. Additional messages may be fetched in the same manner.

Figure 13:
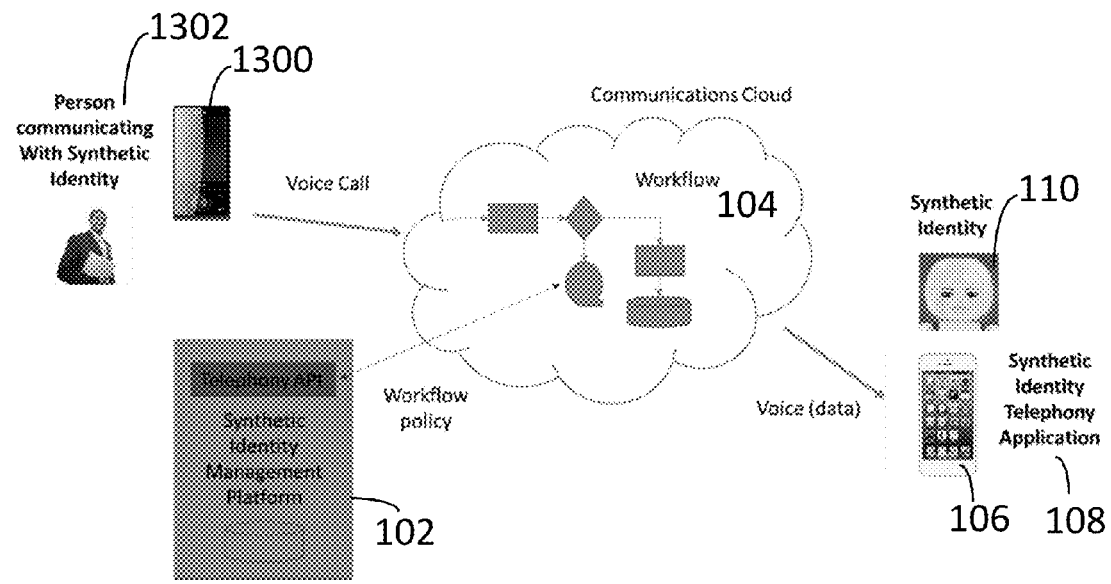
FIG. 13 illustrates a synthetic identity receiving a voice call.

In the scenario of FIG. 13, a party 1302 using device 1300 makes a voice call to the phone number for synthetic identity 110. In particular, John Smith 1302 calls Shopping Sally's phone number. This phone number is a specific number that the platform 102 has requested from the Communication Cloud 104 for the Shopping Sally identity. The Communication Cloud 104 communicates with the Synthetic Identity Management Platform 102. The platform 102 responds with instructions to forward a data call (VoIP) to the user's Synthetic Identity Telephony Application 108. It is necessary to establish a VoIP call with the user's Synthetic Identity Telephony Application 108 so that it can provide the full context information to the user (i.e., Synthetic Identity being called and caller). If a standard voice call was made to the user's standard mobile phone application, then only the caller ID of the caller is available.

Figure 14:
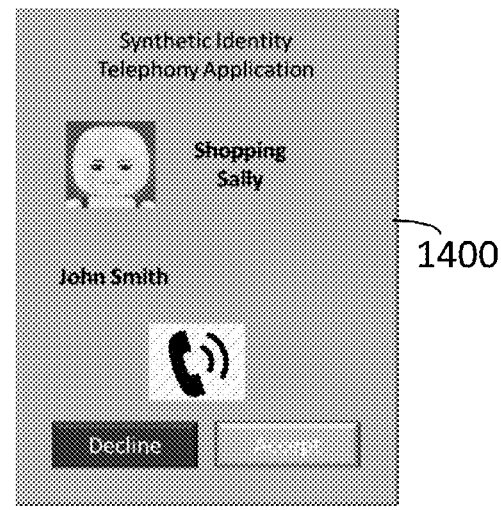
FIG. 14 illustrates a user interface for a synthetic identity receiving a voice call.

FIG. 14 shows a user interface 1400 with an avatar that shows that the message is intended for Shopping Sally. The caller (John Smith) is also identified. This interface allows the user to understand the full context of the incoming call. That is, both the synthetic identity (Shopping Sally) being called and the caller (John Smith) are identified. This is not possible with standard mobile device phone applications.

Figure 15:
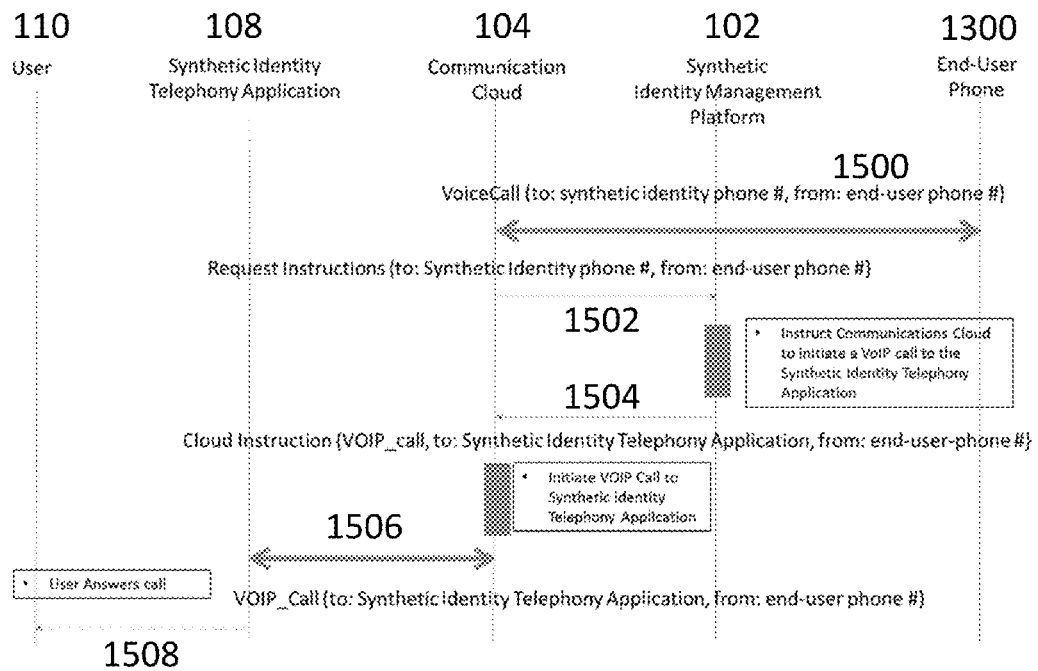
FIG. 15 illustrates signal processing associated with a synthetic identity receiving a voice call.

FIG. 15 more particularly characterizes this processing. End user 1300 initiates a voice call 1500, which is received in the communication cloud 104. The communication cloud 104 requests instructions 1502 from the platform 102. The platform 102 generates instructions 1504, which specify a VoIP call to a synthetic identity application from the call originator. The communication cloud 104 initiates the call 1506 in response to these instructions. The call 1506 transpires between the communication cloud 104 and the application 108. More particularly, the communication cloud 104 coordinates signal paths 1506 and 1500 to establish a voice call.

Figure 16:
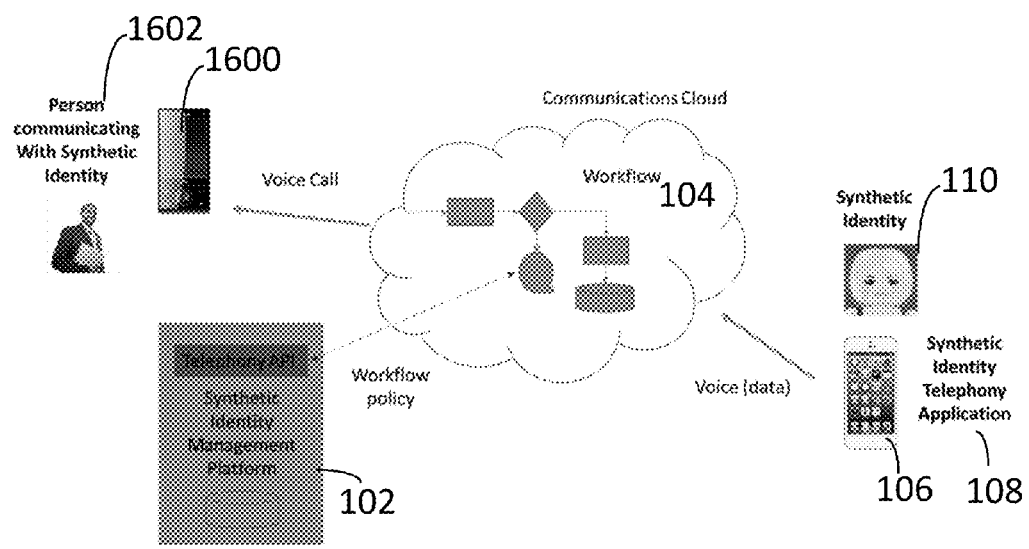
FIG. 16 illustrates operations associated with a synthetic identity calling a party in accordance with an embodiment of the invention.

FIG. 16 illustrates a scenario in which the synthetic identity (Shopping Sally) 110 using device 106 wants to call the user (John Smith) 1602 using device 1600. The Synthetic Identity Telephony Application 108 makes a VoIP call to the Communications Cloud 104. A VoIP call is required so that the full synthetic identity context can be relayed to the Communications Cloud 104. The Communication Cloud 104 receives the VoIP call, and communicates with the Synthetic Identity Management Platform 102 for instructions. The Synthetic Identity Management Platform 102 instructs the Communications Cloud 104 to open a Voice call to the party (John Smith). The Communications Cloud 104 initiates the call.

Figure 17:
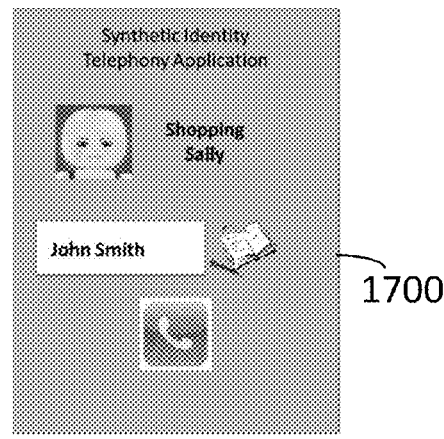
FIG. 17 illustrates a user interface to facilitate a synthetic identity calling a party.

FIG. 17 shows the user interface 1700 of the Synthetic Identity Telephony Application when used to call the party (John Smith). The user is working in the context of Shopping Sally as shown by the name and avatar. The synthetic identity can access the Synthetic Identity address book or use the dialing function. The party (John Smith) receives a call from the synthetic identity number (Shopping Sally). The user interface 1700 supplies the working context to avoid confusion.

Figure 18:
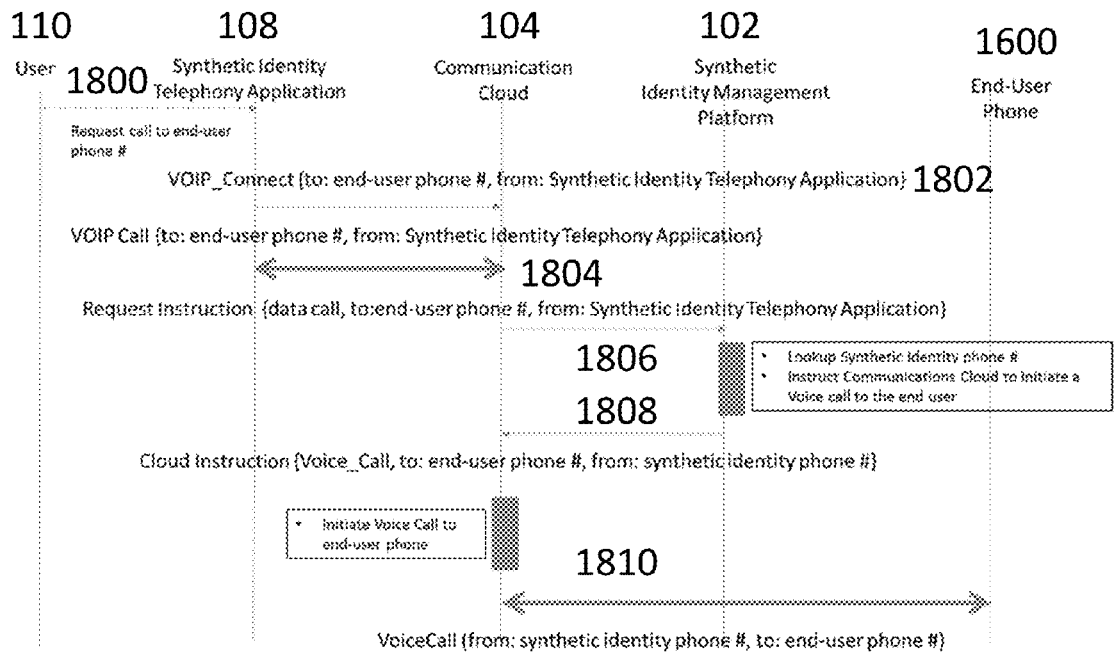
FIG. 18 illustrates signal processing associated with a synthetic identity calling a party.

The foregoing processing is more fully characterized in FIG. 18. User 110 initiates a call 1800 using application 108. The application 108 requests a VOIP connection 1802 with communication cloud 104. A VoIP call is initiated 1804 between the communication cloud 104 and the application 108. The communication cloud 104 requests instructions 1806 from the platform 102 regarding how to handle the call. The platform 102 sends information 1808 to the communication cloud 104. The communication cloud 104 then establishes the call 1810 to the end-user phone 1600. The communication cloud 104 links the two sessions 1804 and 1810.

Figure 19:
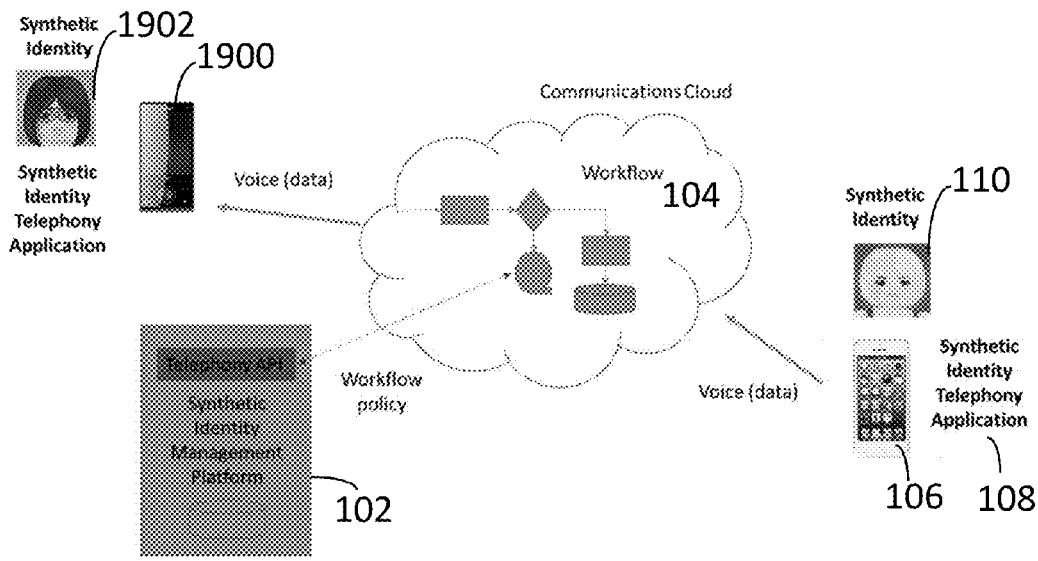
FIG. 19 illustrates processing associated with one synthetic identity calling another synthetic identity.

An alternative to the above sequence can be made when the receiver is also a synthetic identity with a Synthetic Identity Telephony Application. FIG. 19 illustrates this scenario with device 1900 and synthetic identity telephony application 1902. In this case the Communications Cloud 104 can use a VoIP call to the receiving Synthetic Identity Telephony Application 1902.

Figure 20:
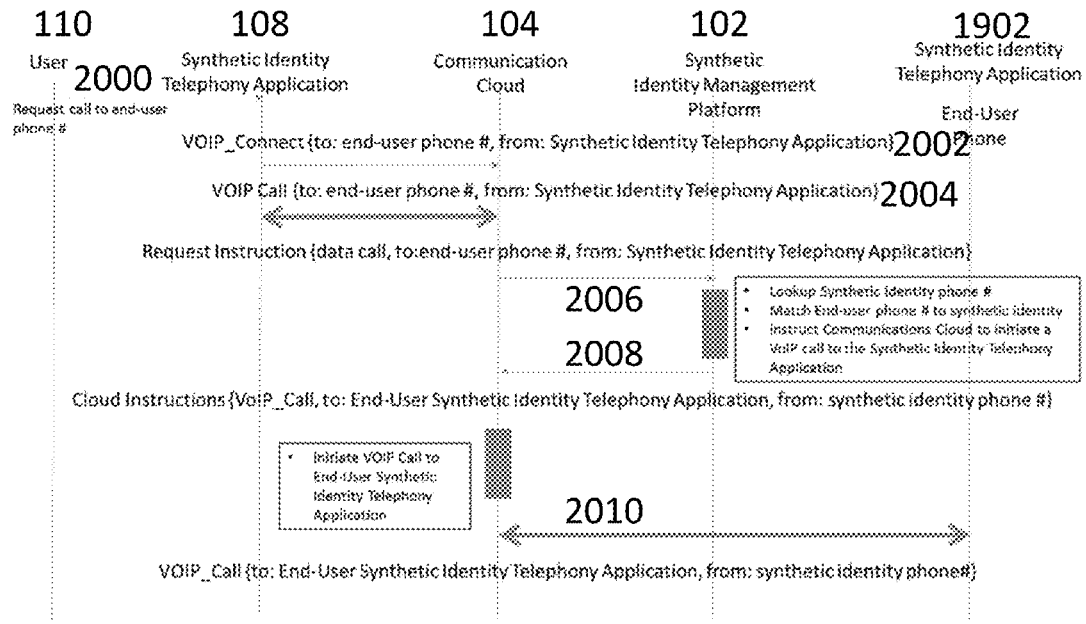
FIG. 20 illustrates signal processing associated with one synthetic identity calling another synthetic identity.

FIG. 20 illustrates synthetic identity 110 initiating a call request 2000 via application 108. The application requests a VoIP connection 2002 from the communication cloud 104. A VoIP session 2004 is initiated between the communication cloud 104 and the application 108. The communication cloud 104 requests instructions 2006 from the platform 102. The platform 102 looks up the synthetic identity phone number, matches the end-user phone number to the synthetic identity and instructs 2008 the communication cloud 104 to complete the VoIP call. The communication cloud 104 establishes a VoIP call 2010 with the end user application 1902 and links sessions 2004 and 2010.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
    a processor; and
    a memory connected to the processor, the memory storing instructions executed by the processor to:
        match a communication sender number or a communication receiver number associated with a communication to a synthetic identity, wherein the synthetic identity is one of a plurality of synthetic identities associated with a real user, wherein each synthetic identity has unique identity attributes,
        select a parameter associated with the synthetic identity, wherein the parameter is one of the unique identity attributes, and
        coordinate delivery of the communication such that the recipient of the communication views the parameter upon receipt of the communication and thereby views a unique identity attribute of the synthetic identity.

2. The machine of claim 1 wherein the communication is a text message.

3. The machine of claim 1 wherein the communication is a telephone call.

4. The machine of claim 1 wherein the parameter is selected from a synthetic identity name and a synthetic identity telephone number.

5. The machine of claim 1 wherein the instructions executed by he processor to coordinate delivery of the communication include instructions to supply a user interface that displays the parameter.

6. The machine of claim 1 wherein the instructions executed by the processor to coordinate delivery of the communication include instructions to coordinate delivery of the communication from the machine.

7. The machine of claim 1 wherein the instructions executed by the processor to coordinate delivery of the communication include instructions to coordinate delivery of the communication from a different machine.

8. The machine of claim 1 further comprising instructions executed by the processor to coordinate a message notification to the recipient of the communication.

* * * * *